United States Patent [19]

Okado

[11] Patent Number: 4,597,037

[45] Date of Patent: Jun. 24, 1986

[54] CONTROL SYSTEM FOR A VOLTAGE-TYPE INVERTER

[75] Inventor: Chihiro Okado, Fuchu, Japan

[73] Assignee: Kabushiki Kaisha Toshiba, Kawasaki, Japan

[21] Appl. No.: 657,881

[22] Filed: Oct. 5, 1984

[30] Foreign Application Priority Data

Oct. 7, 1983 [JP] Japan .................................. 58-187071

[51] Int. Cl.$^4$ ........................................... H02M 7/537
[52] U.S. Cl. ........................................ 363/41; 363/98
[58] Field of Search ............................. 363/41, 56–58, 363/97, 98, 132, 136–138; 318/811, 812

[56] References Cited

U.S. PATENT DOCUMENTS

| | | | |
|---|---|---|---|
| 3,919,620 | 11/1975 | McMurray et al. | 363/41 X |
| 4,063,143 | 12/1977 | Forstbauer | 363/41 X |
| 4,348,734 | 9/1982 | Dougherty | 363/41 X |
| 4,445,167 | 4/1984 | Okado | 363/41 X |
| 4,502,106 | 2/1985 | Glennon | 363/132 X |
| 4,546,422 | 10/1985 | Okado | 363/41 |

OTHER PUBLICATIONS

1983 Journal Article of Akamatsu et al, "Ultrasonic—Frequency-PWM Inverter Using Capable Bipolar Transistor and a New PWM Control Method".

Primary Examiner—Philip H. Leung
Attorney, Agent, or Firm—Schwartz, Jeffery, Schwaab, Mack, Blumenthal & Evans

[57] ABSTRACT

In a control system for a voltage-type inverter which comprises a bridge connection of electric valves each comprising a reverse parallel connection of a semiconductor switching element and a diode, and converts a DC power to an AC power by means of PWM control, a voltage detection device is provided to detect an output voltage of the inverter. A voltage correction circuits corrects the pulse width of the pulse width modulation signal in accordance with the comparison of the detected voltage and the PWM signal. A drive circuit, which provides a dead time during which the switching elements of the electric valves connected in series with each other are concurrently non-conductive, uses the corrected PWM signal for driving the switching element.

8 Claims, 25 Drawing Figures (a)

(b)

(c)

CONTROL SYSTEM FOR A VOLTAGE-TYPE INVERTER

BACKGROUND OF THE INVENTION

The present invention relates to a control system for a voltage-type inverter comprising a bridge connection of electric valves each comprising a reverse parallel connection of a semiconductor switching element and a diode and converting a DC power to an AC power by means of pulse-width modulation control (hereinafter referred to as PWM control).

FIG. 1 shows a conventional system. As shown, a DC power from a DC power source 1 is converted to an AC power by an inverter bridge 2 and supplied to a load motor 3, which, for the purpose of description, will be assumed to be an induction motor. The inverter bridge 2 comprises a bridge connection of electric valves each comprising a reverse parallel connection of a transistor 21-26 and a diode 31-36.

An inverter frequency setting device 4 provides a frequency reference voltage, which is applied to a ramp function generator 5, which limits the rate of change of the voltage. The output of the ramp function generator 5 is supplied to a voltage pattern generator 6, and an inverter output voltage pattern outputted by the voltage pattern generator 6 is supplied to an AC voltage reference circuit 8. The output of the ramp function generator 5 is converted, by a V/F converter (voltage-to-frequency converter) 7, to a frequency proportional to the inverter frequency. The AC voltage reference circuit 8 receives the voltage pattern output and the V/F converter output and produces voltage reference $V^*_U$, $V^*_V$, $V^*_W$. An oscillator 9 generates a trigonal wave $e_t$ for modulation. Comparators 10, 11, 12 compare the trigonal wave $e_t$ with the voltage references $V^*_U$, $V^*_V$, $V^*_W$, resepectively to produce PWM outputs $PWM_U$, $PWM_V$, $PWM_W$, which are amplified by a drive circuit 13 and are used to drive the inverter bridge.

PWM control is well known, but, for an easier understanding of the invention, its fundamentals will be briefly discussed with reference to FIG. 2. Incidentally, today's control system often employs a microprocessor for the PWM operation, but the same principle is applied.

For the sake of simplicity, description is made with reference to one of the phases, e.g., phase U. Similar operations are performed with respect to other phases.

The U-phase voltage reference $V^*_U$, which is sinusoidal, is compared with the trigonal wave $e_t$, and a PWM output $PWM_U$ is produced. The fundamental wave of the output $PWM_U$ is proportional to the voltage reference $V^*_U$. PWM control is accomplished by adjusting the magnitude and the frequency of the voltage reference $V^*_U$.

Typical examples of the switching elements used in the inverter bridge are thyristors, transistors, gate-turn-off thyristors (GTO's). These elements have more or less delay in switching, particularly in turn-off. Also this delay time is not precisely known and can vary depending on various factors. For this reason, it is necessary to take a measure for ensuring that, at no moment, the series connected switching elements, such as the transistors 21 and 24 in FIG. 1 are concurrently conductive. As such a measure, a dead time is provided so that the transistor 24 is turned on certain time after the transistor 21 is turned off. Further description on this point is given with reference to FIGS. 3 and 4.

FIG. 3 shows, in detail, part of the drive circuit 13 of FIG. 1 which relates to one of the phases, i.e., phase U. The PWM signal $PWM_U$ is passed through an on-delay circuit 132 which delays, by a delay time $T_D$, only the leading edge of the signal pulse. The output signal $V_1$ of the on-delay circuit 132 is amplified by a drive amplifier 134, whose output constitutes a drive signal $V_{21}$ for the transistor 21. The signal $PWM_U$ is also fed to a logic circuit 131, where it is inverted to become a signal $\overline{PWM}_U$, and is then passed through an on-delay circuit 133, similar to the circuit 132. The output signal $V_2$ of the on-delay circuit 133 is amplified by a drive amplifier 135, whose output constitutes a drive signal $V_{24}$ for the transistor 24.

FIG. 4 shows the operation. The transistors 21, 24 are turned on and off by the signals $V_1$, $V_2$ whose leading edges are lagging behind $PWM_U$, $\overline{PWM}_U$, respectively, by $T_D$. The turn-on time of the transistors 21, 24 is not more than 1 $\mu$sec. and can be neglected. On the other hand, the turn-off time $t_{off}$ of the transistors is several $\mu$sec to several tens of $\mu$sec. To make sure that simultaneous conduction of the series connected transistors 21, 24 be avoided, the delay time $T_D$ is set to be two to three times the turn-off time. As a result, there is a time interval when the transistors 21, 24 are both non-conductive, and during this time interval, the inverter output voltage is not definite. This point will be described with reference to FIG. 5.

The inverter output voltage $V_{U-O}$ is a voltage of the inverter U-phase output with reference to a neutral point 0 which is an imaginary mid-point which results when the DC power source 1 is imaginarily divided into two parts $1_a$ and $1_b$. The inverter output line voltages can be derived, as is well known, from the differences between the voltages $V_{U-O}$, $V_{V-O}$, $V_{W-O}$, i.e., the three output phase voltages on the respective output terminals with reference to the neutral point O.

Now attention is directed to the voltage $V_{U-O}$ across the inverter U-phase output terminal and the neutral point O. It is assumed that while the load current I is flowing in the direction (hereinafter referred to as the "positive direction") indicated by an arrow of a solid line in FIG. 6, the drive signal $V_{24}$ for the transistor 24 falls (from on to off) at a time point $t_0$. Because of the turn-off time $t_{off}$ of the transistor, the transistor 24 becomes actually non-conductive at a time point $t_1$ ($t_{off}$ after $t_0$). As a result, as shown in FIG. 5(f), the voltage $V_{U-O}$ is negative until $t_1$. During the period from $t_1$ to $t_2$ when the transistor 21 becomes conductive, the transistors 21, 24 are both non-conductive. If the load current I continues to flow in the direction of the arrow of the solid line, no other circuit but one through the diode 34 is formed so that the terminal U has substantially the same potential as the negative terminal of the DC power source and the voltage $V_{U-O}$ is kept negative until $t_2$. During the period $t_2$-$t_4$ when the transistor 21 is conductive, the voltage $V_{U-O}$ is positive. During the period $t_4$-$t_5$ when the transistors 21 and 24 are both non-conductive, the diode 34 becomes conductive again and the voltage $V_{U-O}$ becomes negative.

When the load current I is flowing in opposite direction, i.e., in the direction (hereinafter referred to as the "negative direction") indicated by an arrow of broken lines, the voltage $V_{U-O}$ assumes a waveform shown in FIG. 5(g). That is, while the transistors 21, 24 are both non-conductive, the load current I flows through the diode 31 into the DC power source 1 so that $V_{U-O}$ is positive during the period $t_1-t_2$ and the period $t_4-t_5$.

It is thus seen from FIGS. 5(f), (g) that the output voltage differs depending on the direction of the load current despite the fact that the same voltage is desired and attempted by PWM control.

Now consideration is given to variation of the inverter output voltage in relation to the load current in a situation where the load motor is an induction motor. In FIG. 7 the voltage reference $V^*_U$ is indicated by a solid line while the actual inverter output voltage $V_{U-O}$ is indicated by a broken line. When the induction motor is under no load, the load current is, as shown in FIG. 7(a), lagging by about 90°. During the period 0°–90° and 270°–360°, the current is negative, so that the situation is like that of FIG. 5(g) and hence the actual inverter output voltage $V_{U-O}$ is higher (more positive) than the reference $V^*_U$. During the period 90°–270°, the current is positive, so that the situation is like that of FIG. 5(f) and hence $V_{U-O}$ is lower (more negative) than $V^*_U$.

When the induction motor is under full load, the power factor of the load is higher and the larger portion (in terms of time) of the inverter output voltage suffers decrease, and the average voltage is decreased.

When the induction motor is in regenerative operation, the inverter output voltage is generally increased as shown in FIG. 7(c).

Thus, the inverter output voltage varies depending on the power factor of the load, or the phase of the current relative to the voltage. The amount of variation is substantially fixed regardless of the magnitude of the output voltage. As a result, the voltage regulation (change in the output voltage) is increased. In addition, the output voltage waveform is distorted (away from sinusoidal). Moreover, magnetic flux of the induction motor is varied because of the variation in the inverter output voltage, and the operation of the motor is unstable, and the efficiency of the motor is lowered because of the distorted current waveform, and torque ripple is increased.

SUMMARY OF THE INVENTION

An object of the invention is to solve the problems discussed above.

Another object of the invention is to provide a control system for a voltage-type inverter with which it is possible to reduce the waveform distortion in the inverter output voltage and to reduce the output voltage regulation.

According to the invention, there is provided a control system for a voltage-type inverter which comprises a bridge connection of electric valves each comprising a reverse parallel connection of a semiconductor switching element and a diode, and converts a DC power to an AC power by means of pulse width modulation control, said control system comprising:

a pulse width modulation control circuit responsive to a reference value for producing pulse width modulation signals, a voltage detector for detecting an output voltage of the inverter to produce a voltage detection signal, a voltage correction circuit responsive to the pulse width modulation signal and the voltage detection signal for correcting the pulse width of the pulse width modulation signal to produce a corrected pulse width modulation signal, and a drive circuit responsive to the corrected pulse width modulation signal for driving the switching element of each valve of the inverter, said drive means including means for providing a dead time during which the switching elements of the electric valves connected in series with each other are concurrently non-conductive.

DETAILED DESCRIPTION OF THE PREFERRED EMBODIMENTS

Figure 1:
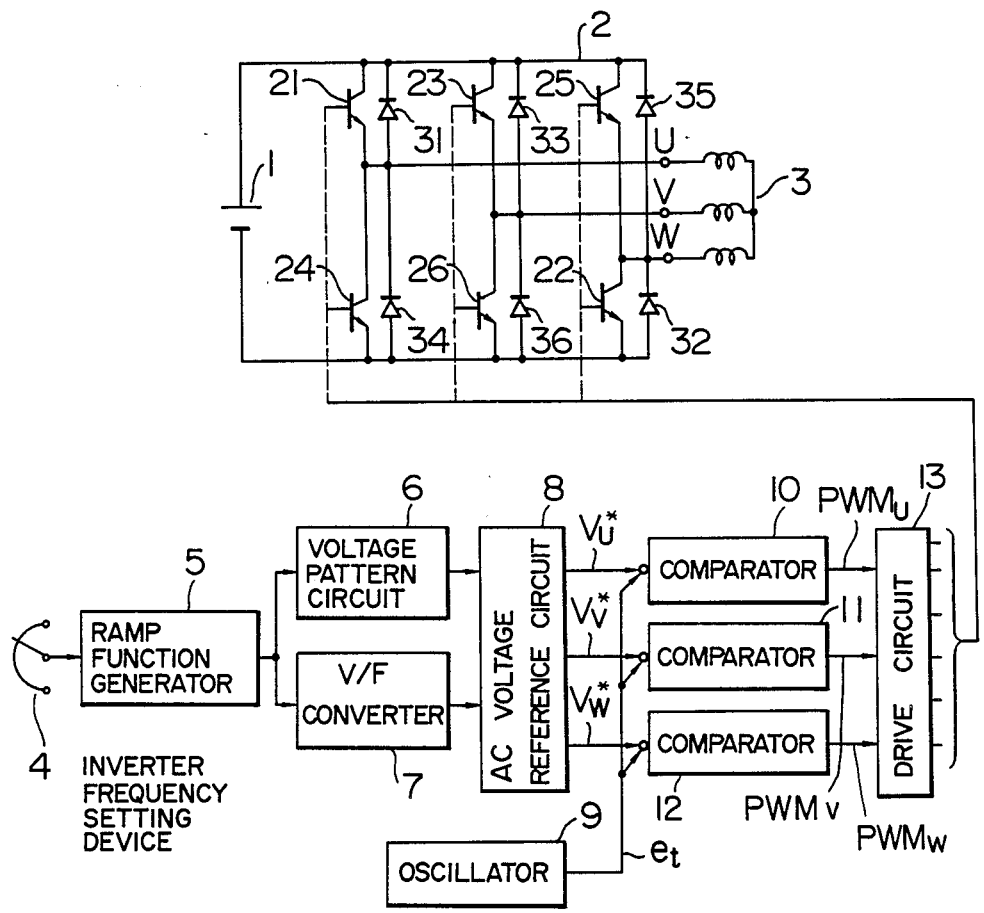
FIG. 1 is a diagram showing an inverter with a conventional control system.
Figure 2:
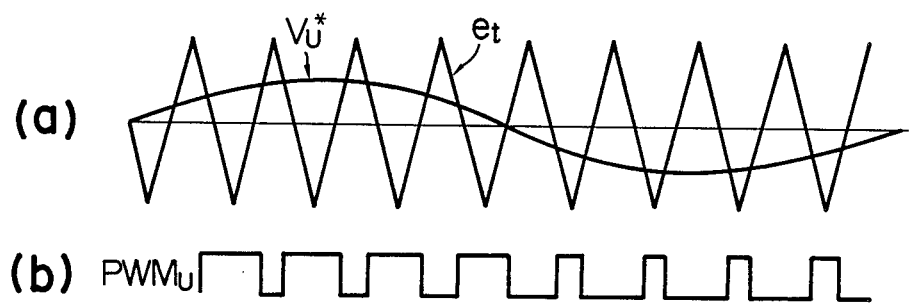
FIGS. 2(a) and 2(b) are time charts used for describing the principle of PWM control.
Figure 8:
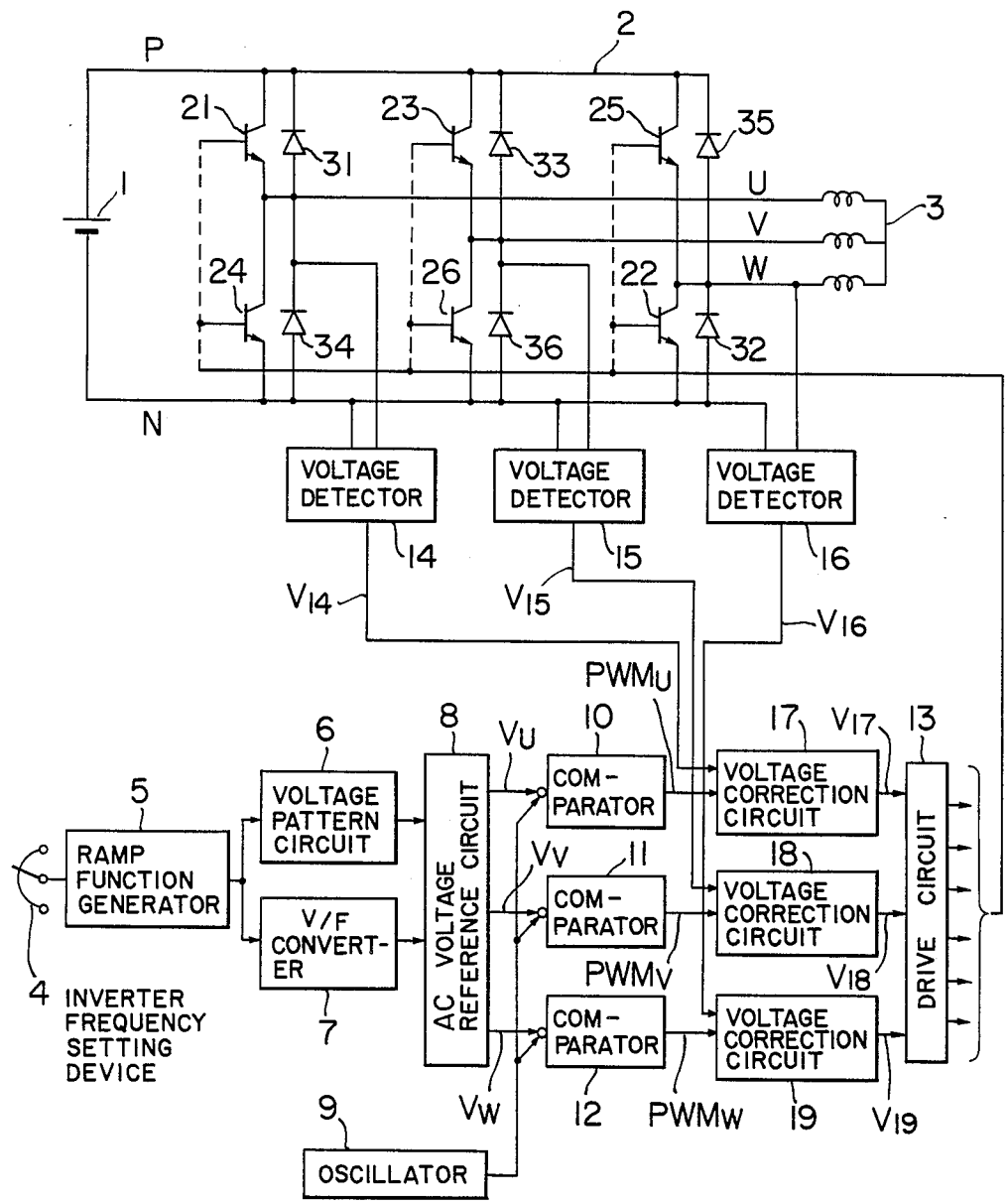
FIG. 8 is a diagram showing an inverter with a control system according to the invention.

FIG. 8 shows an embodiment of the invention. The same reference numerals as in FIG. 1 denote similar devices, and their description is omitted.

Voltage detectors 14, 15, 16 are provided to detect voltages across the collectors and the emitters of the respective transistors 24, 26, 22 in other words across the respective AC terminals U, V, W of the inverter bridge 2 and the DC negative terminal N of the inverter bridge 2, and to produce voltage signals $V_{14}$, $V_{15}$, $V_{16}$ which are binary signals, i.e., assume either "High" level or "Low" level.

Voltage correction circuits 17, 18, 19 are provided to receive the outputs $V_{14}$, $V_{15}$, $V_{16}$ of voltage detectors 14, 15, 16 and the PWM signals $PWM_U$, $PWM_V$, $PWM_W$ and to produce corrected PWM signals $V_{17}$, $V_{18}$, $V_{19}$, which are supplied to the drive circuit 13. The drive circuit 13 drives the inverter bridge 2 in a manner described earlier.

Figure 9:
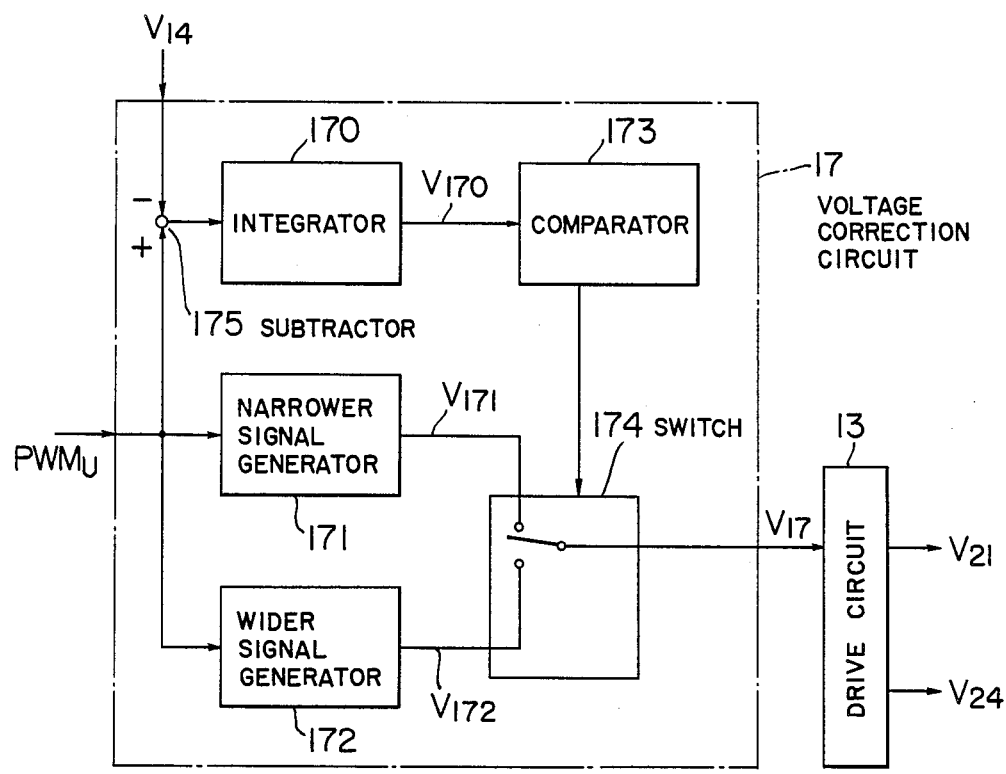
FIG. 9 is a diagram showing in detail an example of the voltage correction circuit 17.

The voltage correction circuits 17, 18, 19 are all alike and only one of them will be described in detail. FIG. 9 shows an example of the voltage correction circuit 17.

As shown, the voltage signal $V_{14}$ from the voltage detector 14 is applied to a subtractor 175 and the PWM signal $PWM_U$ is applied to the subtractor 175, a narrower signal generator 171 and a wider signal generator 172.

The narrower signal generator 171 produces a narrower signal $V_{171}$ which is a little narrower than the PWM signal $PWM_U$.

The wider signal generator 172 produces a wider signal $V_{172}$ which is a little wider than the PWM signal $PWM_U$.

Figure 5:
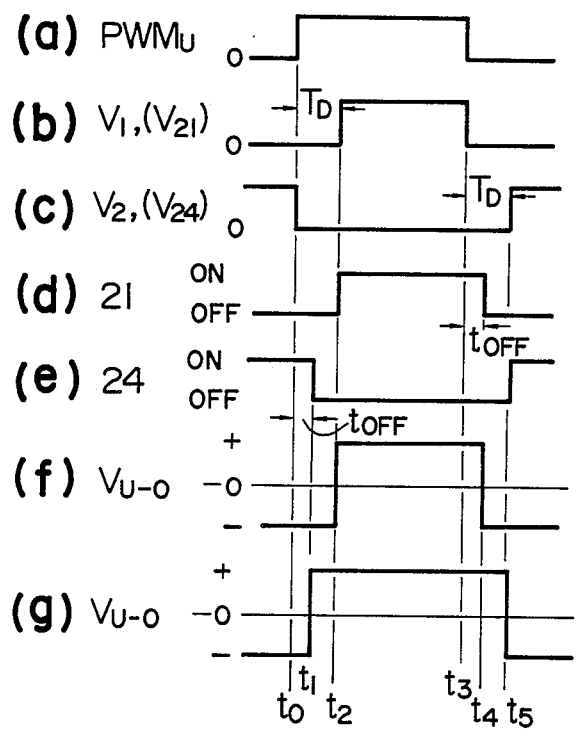
FIGS. 5(a)–5(g) are time charts showing operation of transistors.
Figure 4:
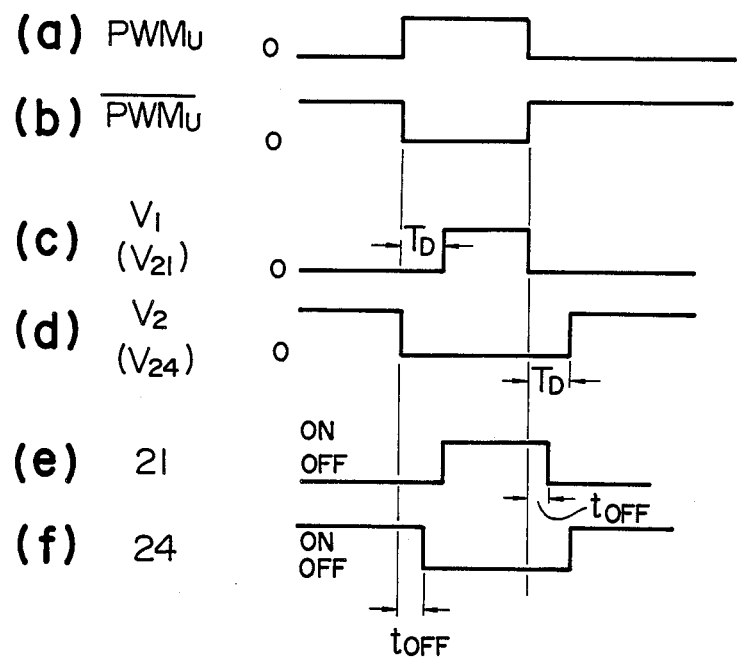
FIGS. 4(a)–4(f) are time charts showing various signals produced in the circuitry of FIG. 3.
Figure 7:
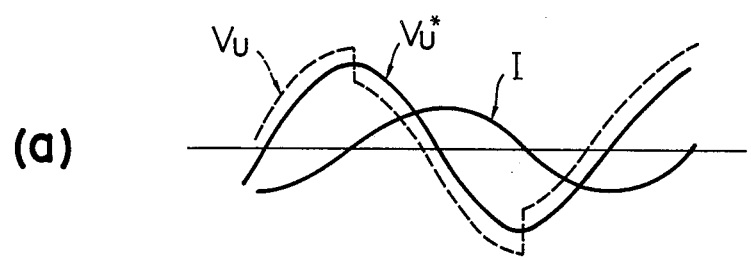
FIGS. 7(a)–7(c) are diagrams showing how the actual voltage is distorted.
Figure 7:
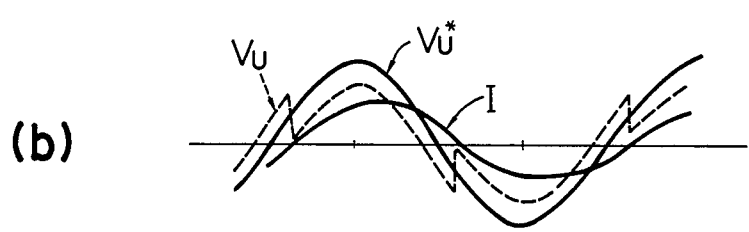
Figure 7:
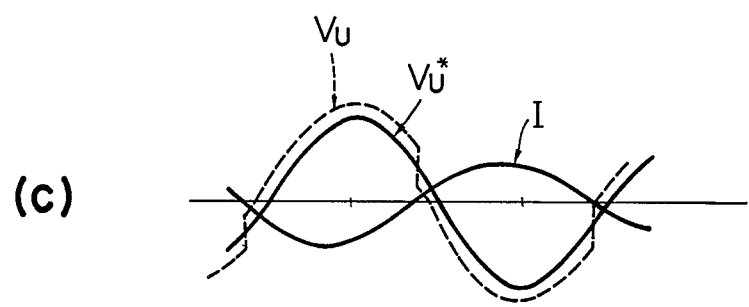

The narrower signal $V_{171}$ is narrower and the wider signal $V_{172}$ is wider than the PWM signal $PMW_U$ by an amount $\Delta t$ which should be approximately equal to, and preferably equal to or a little larger than the length of the dead time $T_D$–$t_{off}$ during which the switch elements (transistors) of the electric valves connected in series with each other are concurrently non-conductive. Here, it is to be recalled that $t_{off}$ represents the turn-off time of the transistor, and $T_D$ represents the delay time of the control signal. Description on these values $t_{off}$ and $T_D$ was made with reference to FIGS. 4 and 5. When $T_D$ is two times $t_{off}$, $\Delta t$ should be approximately equal to $t_{off}$, or one half of $T_D$.

The subtractor 175 receives the voltage signal $V_{14}$ and the PWM signal $PWM_U$, and to produce a signal indicative of the difference, $PWM_U$–$V_{14}$.

An integrator 170 integrates and amplifies the difference $PWM_U$–$V_{14}$ to produce an analog output $V_{170}$ indicative of the time integral of the difference $PWM_U$–$V_{14}$. The output $V_{170}$ is positive when the pulses of the signal $V_{14}$ are generally narrower than the pulses of the PWM signal $PWM_U$. The output $V_{170}$ is negative when the pulses of the signal $V_{14}$ are generally wider than the pulses of the PWM signal $PWM_U$.

In practice, the subtractor 175 and the integrator 170 may be formed of an operational amplifier having both functions of subtraction and integration.

A comparator 173 compares the integrator output $V_{170}$ with a value of zero to find whether the integrator output $V_{170}$ is positive or negative, and controls a switch 174. More particularly, when the integrator output $V_{170}$ is positive, the switch 174 is made to assume a state where it selects the output $V_{172}$ of the wider signal generator 172. When the integrator output $V_{170}$ is negative, the switch 174 is made to select the output $V_{171}$ of the narrower signal generator 171. The selected signal is passed through and outputted from the switch and constitutes the output $V_{17}$ of the voltage correction circuit 17.

Thus the voltage correction circuit 17 serves to increase the output voltage of the inverter when the output voltage (the width of its pulses) is smaller than is desired and to decrease the output voltage of the inverter when the output voltage (the width of its pulses) is larger than is desired.

Operation of the voltage correction will now be described in further detail with reference to FIGS. 10A and 10B.

Figure 10A:
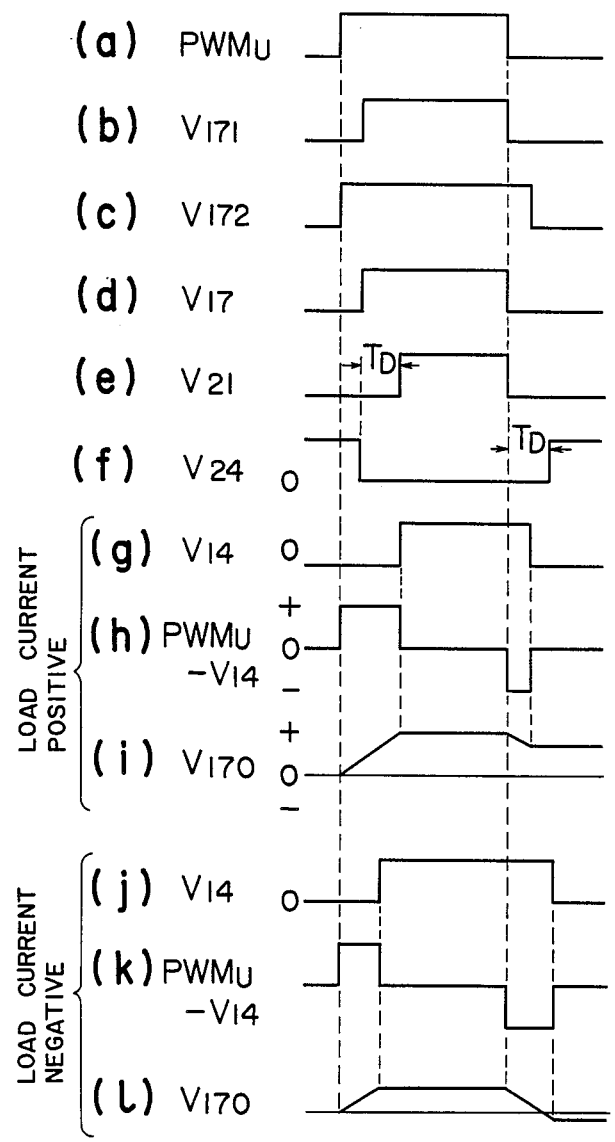
FIGS. 10A and 10B show operation of the control system of FIG. 8 under various conditions.
Figure 10B:
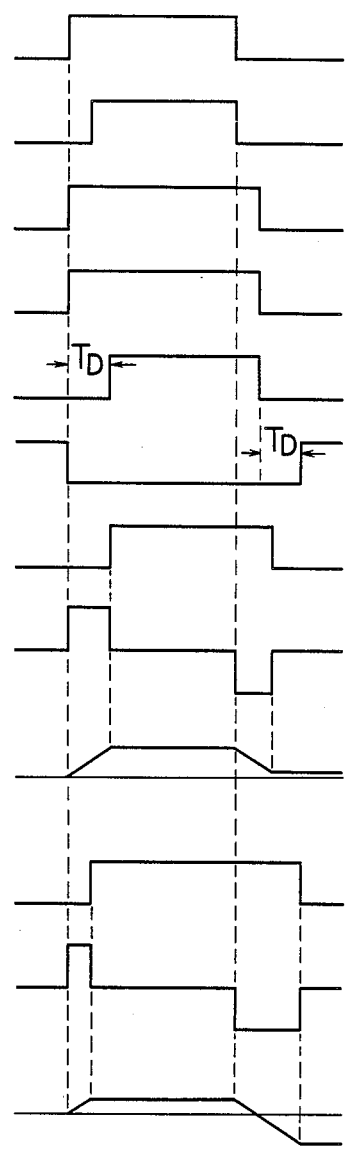

When the switch 174 is in a state where it selects the narrower pulses $V_{171}$, the signals and the voltage appearing at various lines are shown in FIG. 10A, while FIG. 10B shows the signals and voltages when the wider pulses $V_{172}$ are selected.

First, it is assumed that the switch 174 is selecting the narrower pulses $V_{171}$. Responsive to $V_{17} = V_{171}$, the drive circuit 13 outputs the drive signals $V_{21}$, $V_{24}$, having a delay time $T_D$ as explained with reference to FIG. 5, to drive the transistors 21, 24. If, at this time, the current I is flowing in the direction indicated by a solid arrow in FIG. 6, the detected voltage and hence the voltage detection signal $V_{14}$ will be like $V_{21}$ and will be as shown in FIG. 10A at (g). As a result, a difference $PWM_U$–$V_{14}$ ($PWM_U$ being determined on the assumption that the switch element such as the transistor is ideal and has no time lag in its operation) will be as shown in FIG. 10A at (h) and its time integral will be as shown in FIG. 10A at (i). It will be seen that the time integral becomes a positive value and will become larger (more positive) and larger if the situation is unchanged. But when the comparator 173 detects that the integrator output is positive, it causes the switch 174 to be turn over and to begin selecting the wider pulses $V_{172}$. As a result, the detected voltage and hence the voltage detection signal will be as shown in FIG. 10B at (i). Thus, the resultant output is very close (or at least closer), on average, to the desired signal $PWM_U$, and is therefore ideal.

Figure 6:
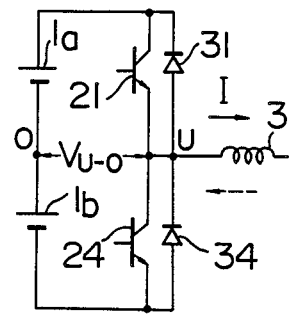
FIG. 6 is a circuit diagram used for describing the relationship between the direction of the load current and the voltage of the output terminal of the inverter.
Figure 3:
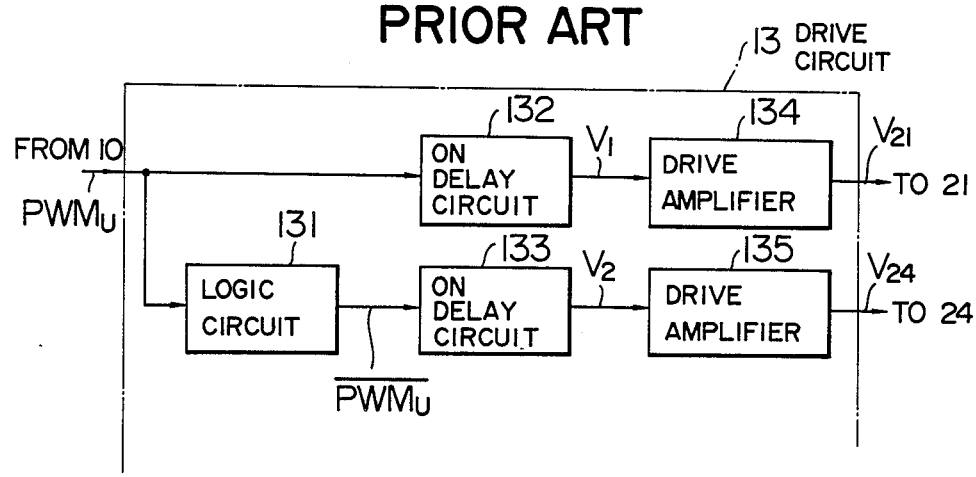
FIG. 3 is a block diagram showing details of an inverter drive circuit.

If the load current is in the direction of the broken arrow in FIG. 6 when the narrower pulses $V_{171}$ are selected, the voltage detection signal $V_{14}$ is about the same as the inverse of $V_{24}$ and is as shown in FIG. 10A at (j). The difference $PWM_U$–$V_{14}$ and the integral $V_{173}$ will be as shown in FIG. 10A at (k) and (l), respectively. As shown, $PWM_U$ and $V_{14}$ are, on average, about equal, and the integral is about zero, so that the switch 174 is kept to select the narrower pulses $V_{171}$.

It is next assumed that the switch 174 is selecting the wider pulses $V_{172}$. If the load current is in the direction of the solid arrow in FIG. 6, the voltage detection signal $V_{14}$ is as shown in FIG. 10B at (g). $PWM_U$–$V_{14}$ will then be, on average, about zero, and the switch 174 is kept unchanged.

If the load current is in the direction of the broken arrow when the wider pulses $V_{172}$ are selected. The voltage detection signal $V_{14}$ will then be as shown in FIG. 10B at (j). $PWM_U$–$V_{14}$ will then be, on average, negative, and its integral will be more and more negative if nothing is done. But the comparator 173 responds to this situation and turns the switch 174 over so that selection of the narrower pulses $V_{171}$ begins. As a result, the output of the inverter bridge 2 is about the same as $PWM_U$.

If the compensation made by the voltage correction circuit 17 is excessive, or in other words if the amount $\Delta t$ is greater than the actual dead time, which is not precisely predicted, then the integrator output $V_{170}$ alternately becomes positive and negative and the turnover of the switch 174 is repeated until the manitude of the integrator output diminishes to a substantially small level. In this situation, the actual output voltage of the inverter is, on average, very close to the desired value as commanded by $PWM_U$.

If on the other hand the compensation is insufficient, there will be a situation where the actual output voltage differs from the desired value $PWM_U$ and is never completely compensated.

This is the reason why it is preferable that $\Delta t$ be equal to or a little larger than the dead time $T_D$–$t_{off}$.

The comparator 173 may have a hysteresis characteristic so that the switch 174 is kept unchanged while the integrator output $V_{170}$ is in a region close to zero. This will prevent too frequent turn-over of the switch 174.

The integrator 170 may be replaced by an amplifier having a first order lag, and yet a similar result is attained.

The output voltages of the inverter bridge to be detected need not be those chosen in the above-described embodiment, but can be others, e.g., the voltages across the respective AC terminals and the mid-potential point of the DC terminals P, N, which mid-potential point may be formed by the use of a voltage divider connected across the terminals P, N.

In place of the analog type circuit of FIG. 8, digital type circuit or digital computer may be used to perform the PWM control. More particularly, a digital counter may be used in place of the integrator 170. Alternatively, an analog integrator may be incorporated in a digital PWM control system. Still alternatively, a digital computer may be used to provide full digital control. Various other combinations can also be adopted.

The invention is not limited to the specific elements used in the inverter bridge, the specific commutation method or the specific number of phases of the inverter bridge, but is applicable to various types of inverters.

As has been described, according to the invention, any deviation of the inverter output voltage from the desired value as commanded by PWM signal is corrected or compensated by the voltage correction circuit, in which a binary signal derived from the detected voltage and the binary PWM signal are compared, and their difference is used to selectively produce a corrected PWM signal which is narrower or wider than the PWM signal, depending on the result of the comparison. The system thus operates as a closed loop, i.e., it performs, in a way, a feedback control to bring the inverter output voltage closer to the desired value commanded by the pulse width modulation signal $PWM_U$. With such an arrangement, distortion in the inverter output voltage is minimized and the voltage regulation is improved, and operation of the inverter is therefore stabilized. When the inverter is used to drive a motor, torque ripple is reduced, and efficiency of the motor is improved because the output voltage is closer to a sine curve.

What is claimed is:

1. A control system for a voltage-type inverter which comprises a bridge connection of electric valves each comprising a reverse parallel connection of a semiconductor switching element and a diode, and converts a DC power to an AC power by means of pulse width modulation control, said control system comprising:
    pulse width modulation control means responsive to a reference value for producing a pulse width modulation signal,
    voltage detection means for detecting an output voltage of the inverter to produce a voltage detection signal,
    voltage correction means responsive to the pulse width modulation signal and the voltage detection signal for correcting the pulse width of the pulse width modulation signal to produce a corrected pulse width modulation signal, and
    drive means responsive to the corrected pulse width modulation signal for driving the switching element of each valve of the inverter, said drive means including means for providing a dead time during which the switching elements of the electric valves connected in series with each other are concurrently non-conductive.

2. A system according to claim 1, wherein said voltage correction means comprises
    narrower signal generator means responsive to the pulse width modulation signal for producing a narrower signal having a pulse width narrower than the pulse width modulation signal,
    wider signal generator means responsive to the pulse width modulation signal for producing a wider signal having a pulse width wider than the pulse with modulation signal,
    subtractor means responsive to the pulse width modulation signal and the voltage detection signal to determine the difference between them, and
    selecting means, for selectively outputting one of the narrower signal and the wider signal in accordance with the difference.

3. A system according to claim 2, wherein said selecting means comprises
    integrator means for integrating the difference, and
    means selecting one of the narrower signal and the wider signal depending on the polarity of the integral of the difference.

4. A system according to claim 2, wherein the narrower signal is narrower and the wider signal is wider than the pulse width modulation signal by an amount which is approximately equal to the dead time.

5. A system according to claim 4, wherein said amount is equal to or larger than the dead time.

6. A system according to claim 1, wherein said voltage detection means comprises means for detecting the voltage across an output terminal of the inverter and a terminal of a fixed potential.

7. A system according to claim 1, wherein said voltage detection means comprises means for detecting a voltage across the electric valve.

8. A system according to claim 1, wherein said voltage detection signal produced by said voltage detection means is a binary signal assuming one of a "high" level and a "low" level.

* * * * *